Feb. 18, 1947.   G. J. KENNEDY   2,416,101
CAPACITOR BUILDING MACHINE
Filed Feb. 24, 1944   3 Sheets-Sheet 2
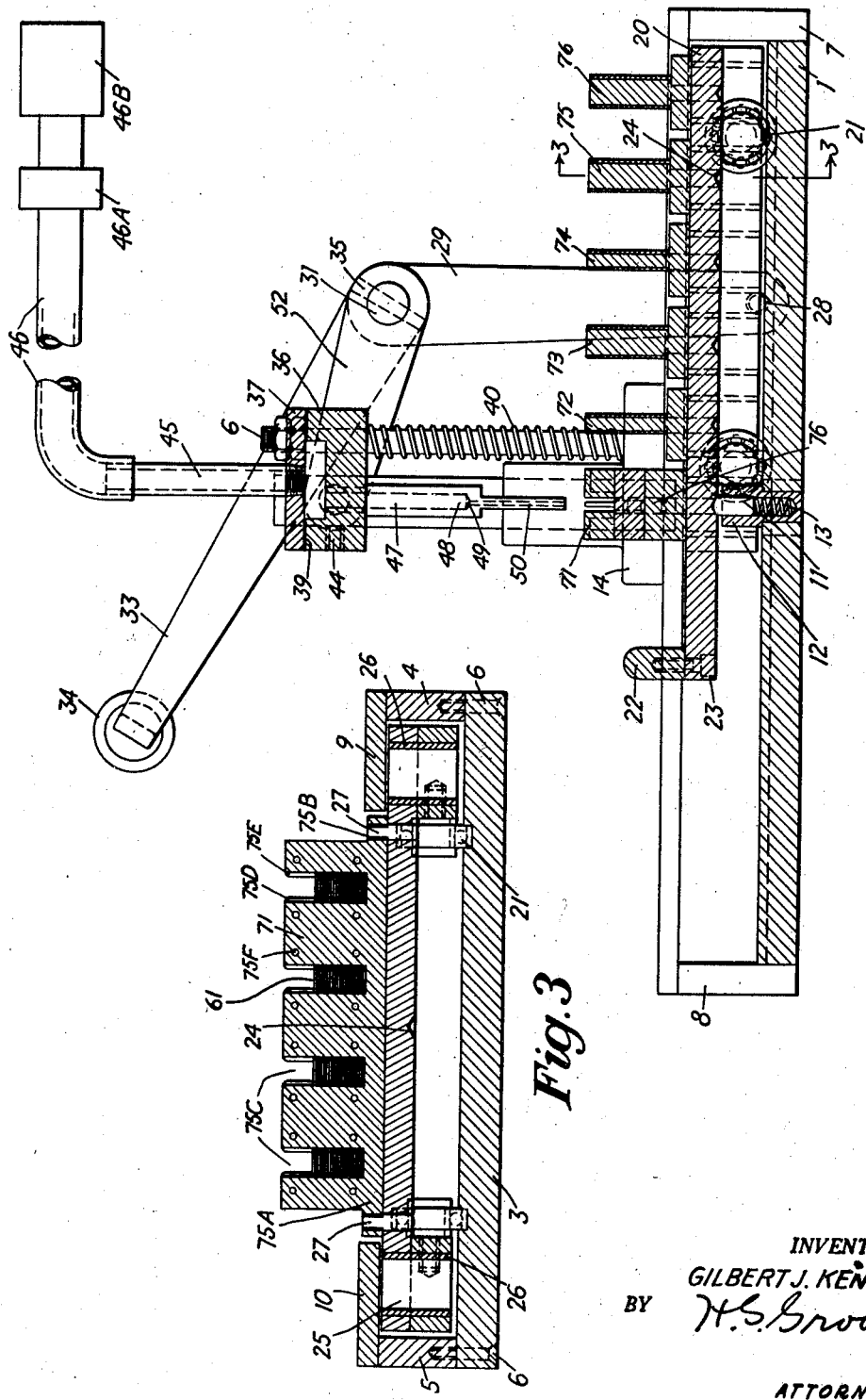
INVENTOR.
GILBERT J. KENNEDY
BY H.S. Grover
ATTORNEY.

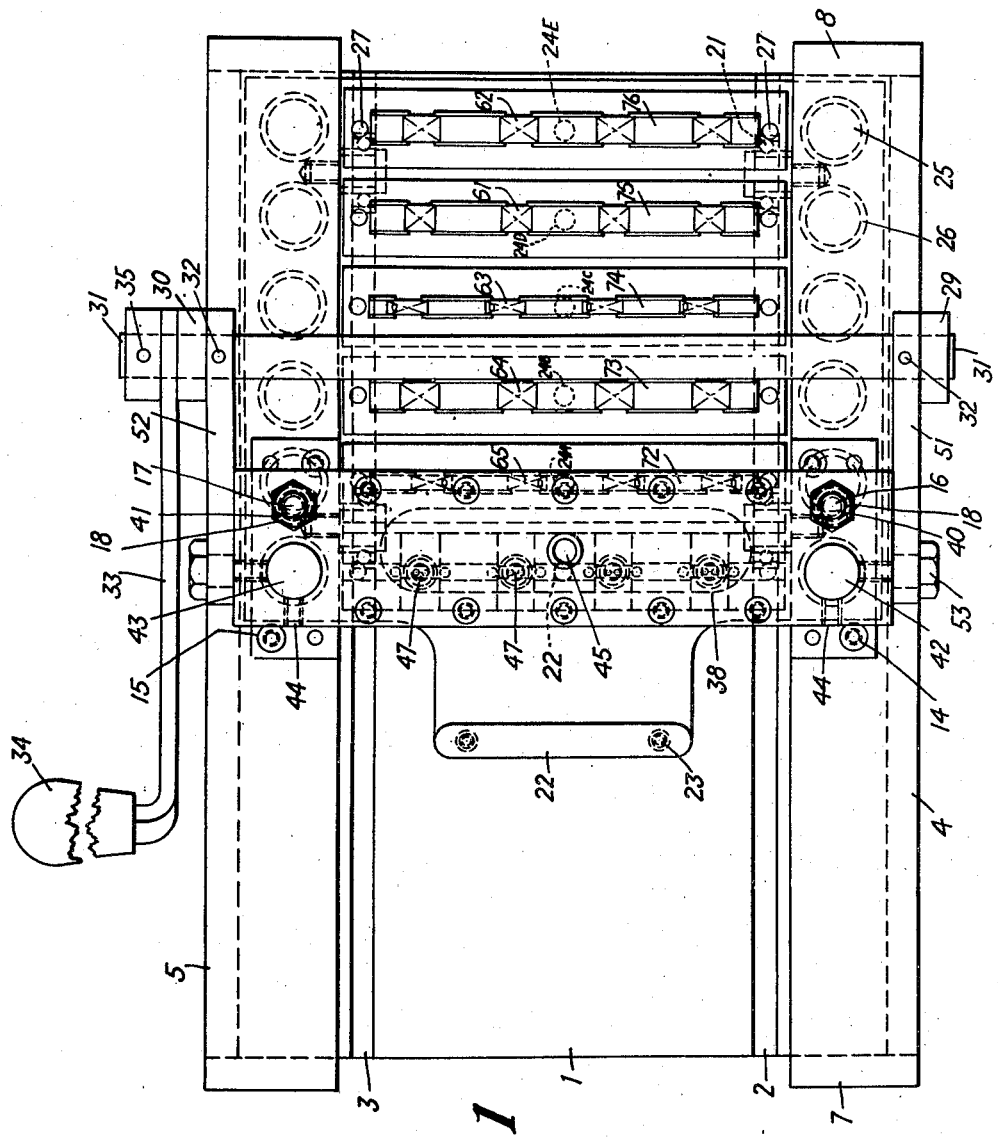

Feb. 18, 1947.  G. J. KENNEDY  2,416,101
CAPACITOR BUILDING MACHINE
Filed Feb. 24, 1944  3 Sheets-Sheet 3

INVENTOR.
GILBERT J. KENNEDY
BY
ATTORNEY.

Patented Feb. 18, 1947

2,416,101

UNITED STATES PATENT OFFICE 2,416,101

CAPACITOR BUILDING MACHINE

Gilbert J. Kennedy, Philadelphia, Pa., assignor to Radio Corporation of America, a corporation of Delaware Application February 24, 1944, Serial No. 523,765

14 Claims. (Cl. 270—58)

1

This invention relates to a new and useful capacitor building machine which is particularly adapted to transfer small units or elements of an electrical capacitor.

An object of this invention is to provide a simple and inexpensive capacitor transfer and building machine which will handle a plurality of capacitor elements simultaneously.

Another object of this invention is to provide a machine to build capacitors in large quantities, and to reduce the manufacturing cost of each unit as well as facilitating the handling of the small elements employed.

A feature of this invention is the arrangement of a movable platform upon a base which has a means for locking the platform at various positions. The platform has an arrangement which retains a plurality of magazines for holding the capacitor elements. According to this invention the various capacitor elements are located in the magazines and handled by a vacuum pick-up device which moves or transfers the individual parts of the capacitor from one position to another on the platform whereby they may be processed or partly assembled to form a complete capacitor unit.

The machine of this invention will serve to simultaneously transfer small elements of electrical capacitors in a simple manner which in the past were too small to handle as a practical matter by hand methods.

By this invention small and more efficient capacitors can be economically produced in large quantities. The machine of this invention is flexible in its general arrangement whereby different process steps of manufacture can be employed to manufacture other devices employing small elements other than the elements of electrical capacitors.

For the purpose of briefly describing the invention, this specification will be limited to two different capacitor process methods:

First, the method of transferring plain uncoated dielectric elements of the capacitor from a removable magazine located in one portion of the machine to a suitable removable mask located in another portion of the machine, which mask serves to provide an uncoated margin. The mask and dielectric elements are later removed from the machine and the dielectric elements are coated on both sides with a metal deposit, which coating serves as the capacitor electrodes, and Second, the method of transferring from removable magazines and stacking individual component parts or elements of a capacitor in a U-

2 shaped metal clamp, the various capacitor elements in the removable magazines being located or arranged in any suitable predetermined order relative to the position of the U-shaped clamp. The removable magazine holding the U-shaped clamp is generally located in the central portion of the machine and after the proper arrangement and number of capacitor elements are assembled, the entire then stacked magazine is removed from the machine and then placed in another machine to bend the top portion of the U-shaped clamps, thus completing the capacitor unit except, of course, the usual vacuum and impregnating processes.

This invention will best be understood by referring to the accompanying drawings in which:

Fig. 1 is a plan view of the capacitor building machine,

Fig. 2 is a longitudinal section of Fig. 1,

Fig. 3 is a cross-section of Fig. 1,

Figure 4:
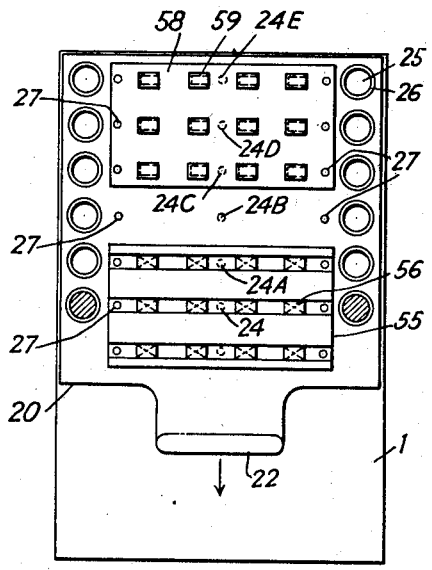
Figure 5:
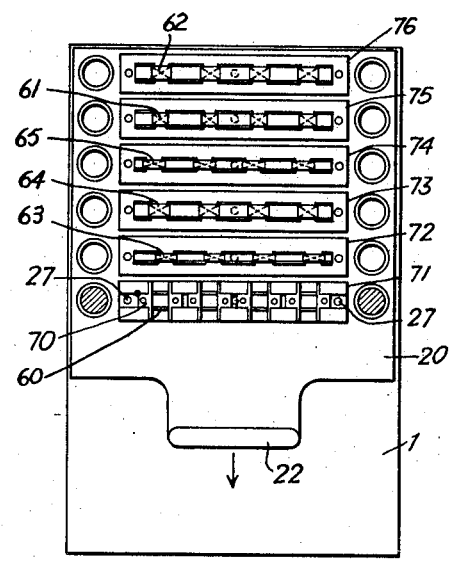
Figure 7:
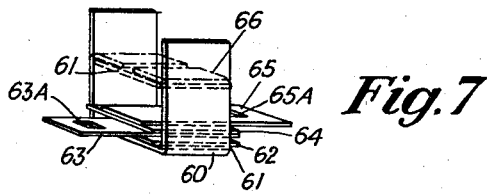
Figure 6:
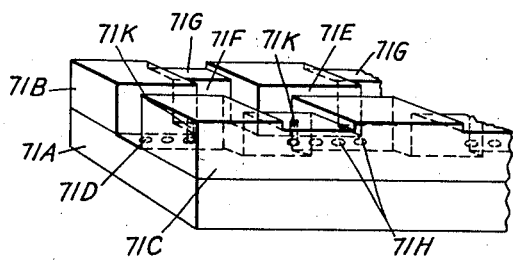
Figure 8:
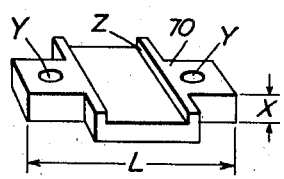

Fig. 4 is a plan view of the machine platform showing a first transferring method, Fig. 5 is a plan view of the machine platform showing a second transferring method, Fig. 6 is a perspective view of one of the magazines to retain the stacked capacitor units, Fig. 7 is a perspective view of one of the capacitor units partly stacked, and Fig. 8 is a detail of the assembly filler block which is placed in the stacking magazine.

Referring now in detail to the drawings, a base 1 has located thereon two grooves 2 and 3 which run the entire length of the base. Side members 4 and 5 are fastened by means of a plurality of screws 6. End members 7 and 8 are provided for supporting the top side members 9 and 10, and also serve as stops. In the central portion of base 1 there is a spring detent member 11 arranged within a tubular support 12 which is fastened to base 1. A helical extension spring 13 is located intermediate the bottom portion of detent 11 and the tubular support member 12 for forcing the detent in an upward position. On each one of the top side members 9 and 10 there are tubular support bushings 14 and 15. Adjacent each bushing, there are located long spring guide studs 16 and 17, each one of which is threaded at the upper portion thereof for retaining threaded nuts 18.

A movable platform 20 is provided with four ballbearing rollers 21 which are located in each corner of the movable platform and are arranged to run in grooves 2 and 3 of base 1. One end of platform 20 is provided with an operating handle 22 which is secured to platform 20 by means of a plurality of screws 23. Platform 20 is provided at the central portion thereof with six equally spaced depressions 24, 24A, 24B, 24C, 24D, and 24E, these depressions being arranged to actuate detent 12 and stop the platform in any predetermined location. On each side of the platform and in line with depressions 24 there are located retaining and positioning apertures 25 which are lined with hardened steel bushings 26. Intermediate apertures 25 there are located the removable magazine securing pins 27. Side members 4 and 5 have a pivot member 28 threaded therethrough. Support arms 29 and 30 are arranged to pivot around members 28. The upper portion of members 29 and 30 are joined together by means of a shaft 31 which is pinned by pins 32. The left hand side of shaft 31 extends beyond member 30 and is provided with a lever 33 which has a handle 34 secured at one end thereof. The other end of lever 33 is pivoted to shaft 31 by means of a tapered pin 35. Supported above tubular support bushings 14 and 15, and guided in position by guide posts 42 and 43, there is a movable bridge which is formed by a lower part 36 and an upper part 37, the lower part 36 being hollowed out at the central portion thereof (as shown by the dash line 38) to provide an air chamber. A gasket 39 is interposed between the two portions 36 and 37, and forms a fluid or airtight seal therebetween. Member 36 is retained in its upper position by means of helical extension springs 40 and 41. Each end of bridge member 36 has secured thereto the guide posts 42 and 43 which are fastened at the upper portions thereof by means of pins 44. The guide posts 42 and 43 are arranged to exactly center the movable platform in the desired position on the base 1. The upper portion of bridge 37 is provided with a pipe 45 to which a flexible rubber hose 46 is secured. Flexible hose 46 connects with a three way foot operated vacuum valve 46A which controls the fluid flow from vacuum pump 46B, both of which are located on the floor beneath the machine. In the lower portion of bridge member 36 there are secured four or more vacuum pick-up devices 47, each one of which is provided with a central aperture 48 which terminates at 49. Two smaller apertures 50 are located at point 49, and serve as the vacuum pickup means for the capacitor elements by maintaining fluid communication between the end of pickup devices 47 and aperture 48. The movable bridge 36 is actuated by means of handle 34 and is joined to shaft 31 by means of links 51 and 52. Links 51 and 52 are fastened to each side of bridge 36 by screws 53.

The first method of transferring plain uncoated dielectric elements is shown by Fig. 4, in which a removable magazine 55 having twelve mica dielectric retaining apertures 56 is placed upon the forward portion of platform 20 and retained in position by pins 27. On the rear portion of platform 20 there is located by pins 27 a removable dielectric masking plate 58 having twelve apertures 59 which are smaller in area than the mica dielectrics. These masks are shown and described in the Scheer U. S. Patent 2,295,759.

The second method of transferring from removable magazines and stacking individual component parts of a capacitor in a U-shaped clamp is shown by Fig. 5 in which removable magazines 71, 72, 73, 74, 75, and 76 are secured to the movable platform 20 by pins 27, it being understood that the number, size and arrangement may be changed to build other types of capacitors or similar devices in which the component parts are too small to be efficiently handled by ordinary hand methods.

Fig. 6 shows a portion of the removable stacking magazine 71 which comprises a base portion 71A and side portions 71B and 71C. The base portion has an aperture 71D located at each end for the removable securing pins 27. A longitudinal slot 71E is formed by the side portions positioned as shown. Four guide slots 71F are formed by cutting out a part of each side portion, and four shallow transverse slots are cut across the top of the side members as shown. On each side of each slot 71F there is a pair of holes 71H. One hole serves to retain foil guide pins 71K, the other acts as an ejector hole.

A portion of a capacitor unit which is to be assembled or stacked by the above mentioned method shown by Fig. 5, is shown in detail in Fig. 7. The capacitor unit comprises a small U-shaped clamp 60 upon which is located a steel bearing plate 61, a micanite plate 62, a left hand terminal foil 63, a mica dielectric 64, and a right hand terminal foil 65. While the capacitor is built up of a large number of alternately arranged foils 63 and 65 which are separated by means of mica dielectrics 64, for the purpose of simplifying the description of this invention only one group of such elements is described here, it being understood that in the building of capacitor units many such capacitor elements are alternately assembled until the desired capacity of the capacitor is obtained, after which a steel bearing plate 61 is placed in position above the elements. The top portion of clamp 60 is bent over as indicated by the dash and dot lines 66 after the magazine is removed from the platform 20.

In order to simultaneously build the above mentioned type of capacitors within the above described machine, the differently arranged removable magazines 71, 72, 73, 74, 75 and 76 are each positioned as shown by Fig. 5. These magazines are somewhat of the same general construction as magazine 71 described in connection with Fig. 6, but of different element guide arrangements which will now be described in detail. Each magazine 72 to 76, inclusive, is arranged to provide for holding four separate groups of capacitor elements which are shown by the crossed dash and dot lines. The groups of capacitor elements are arranged to line up with the vacuum pickup devices 47. The plates are spaced in the position shown by means of cut-outs in the solid block and are retained by means of two side plates, both of which are riveted together by means of rivets, as will be seen from the description of magazine 75. The magazine 72 is for retaining the foils 65 which have a terminal aperture 65A extending to the right; and the magazine has a long narrow block portion for spacing the foils apart in the slots. The magazine 73 is arranged for securing the mica dielectrics 64 and is somewhat similar to the magazine 72 in that the mica dielectrics are located in slots C and spaced apart by means of a solid block portion. The arrangement of magazine 74 is similar to that of magazine 72 except that the foil aperture 63A extends to the left. The bearing plate magazine 75, which is shown in section by Fig. 3, is typical of the other magazines. It comprises a base portion 75A having apertures 75B for retaining the magazine in position on pins 27. Four slots 75C are cut out to retain the bearing plates 61. The ends of each slot are partly closed by means of thin side plates 75D and 75E which are riveted to block 75 by means of rivets 75F. The removable micanite magazine 76 is very similar in construction to magazine 75 except the slot is made larger by reducing the solid block portion and the width of side plates to retain plates 62.

Fig. 8 shows a detail of the clamp spacing blocks 70 which are placed in each slot 71F of magazine 71. The thickness X is made of varied dimensions, to permit variations in the length of clamps 60. The contour dimensions are such as to permit removal from the slotted portion of magazine 71. Two apertures Y are provided for passage of the foil guide pins 71K. A slot Z is cut to retain the base portion of the U-shaped clamps 60. The length L is made long enough to cover the ejection holes 71H through which pins, not shown, may be inserted to remove the blocks 70 and stacked capacitors.

The four U-shaped clamps 60 are retained in position in slots Z which are cut across the width of blocks 70. Within holes 71H are selectively located guide pins 71K, the arrangement being such that the guide pins secure the foils 63 and 65 in proper alignment.

In the operation of this device as applied to the first method mentioned above, the various magazines 55, 58 and 71 to 76, inclusive, are each previously filled with the various capacitor elements. The magazines are placed in any predetermined arrangement on platform 20 (as shown by either Fig. 4 or Fig. 5) and secured in position thereon by means of removable pins 27. In the transferring of mica dielectrics from a plurality of magazines to the masking magazine 58 shown by Fig. 4, a loaded magazine 55 is located in the forward portion of plate 20 and retained by pins 27. A magazine 58 is placed in the rear of platform 20. Platform 20 is placed in position with the vacuum pickup devices 47 being centrally located above the dielectrics 56. It will be noted that only four pickup devices, not twelve, are shown. However, this number can be increased, depending upon the size of movable platform 20 and the size of the dielectric sheets. A machine was made with over forty such pickup devices and if the mica dielectric surfaces were clean and free from grease, no trouble in picking up such a number simultaneously was encountered.

After the pickup devices are centered over the dielectrics, handle 34 is brought down to permit the picking up of the topmost dielectrics in each row, vacuum is applied to the pickup devices by operating the valve 46A, and a dielectric sheet is retained on the end of each pickup device. Handle 34 is released and the pickup devices raised by springs 40. Platform 20 is drawn forward until the magazine 58 is central with the pickup devices. Handle 34 is again brought down to a point where the dielectrics are centrally located above the masking apertures, and the vacuum is released by operation of valve 46A, permitting the dielectrics to drop in the proper position. Next, the handle 34 is released, a cover mask is placed over magazine 58, and both plates are removed to a dielectric metal coating machine, and an empty magazine 58 is put on platform 20. Operations are continued as before until all dielectrics are transferred to the masking magazine for metal coating. In unloading and transferring the then metal coated dielectrics from the masking magazine to magazine 55 again, the above operations are reversed.

In the second or stacking method of the capacitor elements as shown by the arrangement of Fig. 5, the U-shaped clamps 60 are positioned on spacing blocks 70 and put in magazine 71. In this set-up the vertically movable bridge member 36 will be directly above the central part of magazine 71, as shown by Fig. 5. The handle 22 is drawn toward the operator until the detent 11 engages the depressions 24D beneath magazine 71 in the platform 20. In this position all the bearing plates will then lie directly below the four pickup devices 47. The handle 34 is then drawn down upon the surface of plates 61 with the apertures 50 being in contact with the surface of each top plate. The operator then operates the three-way vacuum valve 46A which permits the air to be withdrawn from hose 46 and applies a vacuum to the air chamber which in turn picks up each top bearing plate and transfers them to vacuum pickup devices 47. The platform 20 is then moved to the rear until magazine 71 is brought under the vacuum pickup 47. Handle 34 is brought down, carrying with it the plates 61 which are then placed in position to drop within the U-shaped clamp 60. The operator then operates valve 46A which releases the vacuum and the micanite plates drop in position within the clamp 60. Next the handle 34 is released by springs 40 and the first operation is completed.

In the next operation handle 22 is drawn forward until the magazine 76 is in a position beneath the movable vacuum pickup bridge 36. In this position the micanite plate 62 is picked up in the same manner as mentioned above in connection with the bearing plates. The handle 34 is then drawn down carrying with it micanite plates 62 which are to be assembled upon the top of the bearing plate 61. Then, by operating the valve 46A, the vacuum in the vacuum pickup devices 47 is released and the micanite plates drop in position within clamp 60. Handle 34 is then released. Next, handle 22 is drawn forward to place the magazine 75 (holding the foils 63) in line with the vacuum pickup, and the foils are then picked up by the vacuum pickup devices 47 and are assembled upon the top of micanite plate 62 in the same manner as mentioned above. The platform 20 is then moved in position so that magazine 73, retaining mica dielectrics 64, lies directly below the vacuum pickup devices. The mica dielectrics are then picked up by the devices 47 and retained in this position until the vacuum is released, at which time the dielectrics are retained within the U-shaped clamp 60. Handle 34 is then released. In the next operation the movable platform 20 is then drawn forward until the magazine 72 lies directly below the vacuum pickup, and in this position the foils 65 are then picked up by the vacuum devices 47, and when the vacuum is released the foils then lie upon the top of the mica dielectrics. The above operations are then continued as to the locating of magazines 72, 73 and 74 and these operations are continued until the desired number of micas and foils are assembled to give the proper value capacity of the capacitor which is being built. A steel bearing plate 61 is picked up and deposited in magazine 71 in the manner mentioned above. The magazine 71 is then removed, and later the U-shaped clamps 60 are bent down (as indicated by the dot and dash lines 66 shown in Fig. 7) by another device, and the capacitors are then processed by any suitable wax or impregnation process which is well known in the prior art. An empty magazine 76 is placed in position to replace filled magazine 76 and the operations mentioned above are again continued.

While I have indicated and described a system of my invention, it will be apparent to one skilled in the art that my invention is by no means limited to the particular devices shown and described, but that many modifications may be made without departing from the scope of my invention.

What I claim is:

1. A capacitor building machine comprising a base member, a movable platform arranged to move on said base member, a plurality of magazines for holding a plurality of capacitor elements arranged in different positions on said movable platform, a vacuum pickup device for picking up said elements from said magazines, a detent member for locating said platform in different positions with respect to a fixed position on said base member and said vacuum pickup device.

2. A capacitor building machine comprising a base member, a movable platform arranged to move on said base member, said movable platform having means including a detent member for locating it in different positions with respect to a fixed location on said base member, a plurality of magazines holding a plurality of capacitor elements arranged on said movable platform, a plurality of vacuum pickup devices mounted at said fixed location, means for placing said magazines in different positions with respect to said pickup devices so that said capacitor elements may be assembled by said pickup devices.

3. A capacitor building machine comprising a base member, a movable platform, a bridge member located approximately in the central portion of said base member, a movable arm connected with said bridge member, a plurality of vacuum pickup devices supported by said bridge member, a link member connecting said movable arm with said bridge member, and means for setting a plurality of capacitor elements in a first position on said platform, whereby said elements will be transferred by a change in position of said platform to a second position on said platform by actuation of said movable arm and said pickup devices.

4. A capacitor stacking machine for capacitors of the type which are assembled in a U-shaped clamp, said building machine comprising a base member, a movable platform, a bridge member located approximately in the central portion of said base member, a movable arm connected with said bridge member, a plurality of vacuum pickup devices supported by said bridge member, a link member connecting said movable arm with said bridge member, and means for transferring a plurality of capacitor elements in different positions to be assembled in a U-shaped clamp by said pickup devices by moving said platform in different positions with respect to said bridge member and having said movable arm move said pickup devices.

5. A capacitor stacking machine comprising a plurality of vacuum pickup devices, means including a movable support for transferring a plurality of capacitor elements in different positions relative to said pickup devices, a plurality of magazines for storing a plurality of said capacitor elements located on said movable support, means for creating a vacuum in said pickup devices for transferring a plurality of capacitor elements from said magazines to different positions to be assembled by said pickup devices to form a plurality of stacked capacitors.

6. A capacitor stacking machine comprising a base member, a track on said base member, a movable platform having rollers arranged to move in said track, a detent member for locating said movable platform in different positions with respect to a fixed location on said member, a plurality of magazines for holding a plurality of capacitor elements arranged in different positions on said movable platform, a plurality of vacuum pickup devices, means for locating said magazines in different positions with respect to said pickup devices whereby said capacitor elements are stacked by said pickup devices.

7. A capacitor stacking machine comprising a base member, a track on said base member, a movable platform having rollers arranged to move in said track, said movable platform having means for locating it in at least six different positions with respect to a fixed location on said base member, a plurality of magazines holding a plurality of capacitor elements arranged on said movable platform, a plurality of vacuum pickup devices mounted at said fixed location, means for actuating said pickup devices to pick up said capacitor elements to transfer them in different positions on said movable platform by moving its position with respect to other magazines whereby said capacitor elements may be assembled in a stack.

8. A capacitor building machine comprising a base member, a movable platform, a bridge member located approximately in the central portion of said base member, means for moving said bridge member including a movable arm connected thereto, a plurality of vacuum pickup devices supported by said bridge member, and means for setting a plurality of capacitor elements in different positions on said movable platform to be assembled by said pickup devices by moving said platform in different positions with respect to said bridge member.

9. A capacitor building machine for capacitors of the type which include metal coated dielectrics, said building machine comprising a base member, a movable platform, a bridge member located on said base member, a movable arm connected with said bridge member, a link member connected between said movable arm and said bridge member, a plurality of vacuum pickup devices supported by said bridge member, and means for setting a plurality of capacitor metal coated dielectric elements in different positions on said movable platform, means for actuating said pickup devices to pick up said dielectric elements and to transfer them by moving said platform in different positions with respect to said bridge member.

10. A capacitor building machine for capacitors of the type which have metal coated dielectrics, comprising a base member, a movable platform, a movable masking device arranged to be located on said movable platform, a bridge member located on said base member, a movable arm connected with said bridge member, a link member connected between said movable arm and said bridge member, a plurality of vacuum pickup devices supported by said bridge member, and means for setting a plurality of capacitor elements on said masking device by said pickup devices, and means for placing said platform in different positions with respect to said bridge member.

11. A capacitor building machine comprising a fixed base, a movable platform on said base, a plurality of vacuum pickup devices supported by said base, means for setting a plurality of capacitor elements in different positions on said movable platform to be transferred by said pickup devices, a plurality of magazines for storing a plurality of capacitor elements located at one end of said movable platform, a removable mask located at the other end of said movable platform, means for placing said movable platform in different positions for transferring a plurality of capacitor elements from said magazines to said other end of said movable platform to be picked up by said pickup devices and then placed on said removable mask.

12. A capacitor stacking machine for capacitors of the type which are assembled in a U-shaped clamp, comprising a base member, a movable platform, a bridge member located on said base member, a movable arm connected with said bridge member, a plurality of vacuum pickup devices supported by said bridge member, a link member connected between said movable arm and said bridge member, and means for setting a plurality of capacitor elements including at least mica and foils in different positions to be stacked by said pickup devices in a U-shaped clamp by moving said platform in different positions with respect to said bridge member.

13. A capacitor building machine comprising a base member, a track on said base member, a movable platform arranged to move in said track, said movable platform having means including a detent member for locating it in a plurality of different positions with respect to a fixed location on said base member, a plurality of removable magazines for holding a plurality of capacitor elements arranged on said movable platform to line up with each different position with respect to said fixed location, a plurality of pickup devices, means for setting said magazines in different positions with respect to said pickup devices whereby said capacitor elements may be assembled by said pickup devices.

14. A transferring device comprising a base member, a movable platform, a bridge member located on a portion of said base member, a movable arm linked with said bridge member, a plurality of movable vacuum pickup devices supported by said bridge member, a link member connected between said movable arm and said bridge member, and means for actuating said movable arm for moving by said pickup devices to pick up a plurality of elements and by placing said movable platform in different positions with respect to said bridge member.

GILBERT J. KENNEDY.

REFERENCES CITED

The following references are of record in the file of this patent:

UNITED STATES PATENTS

| Number | Name | Date |
|---|---|---|
| 1,941,106 | Park, Jr. | Dec. 26, 1933 |
| 1,711,647 | Milmoe | May 7, 1929 |

OTHER REFERENCES

2295759, Sheer.